Figure 1:
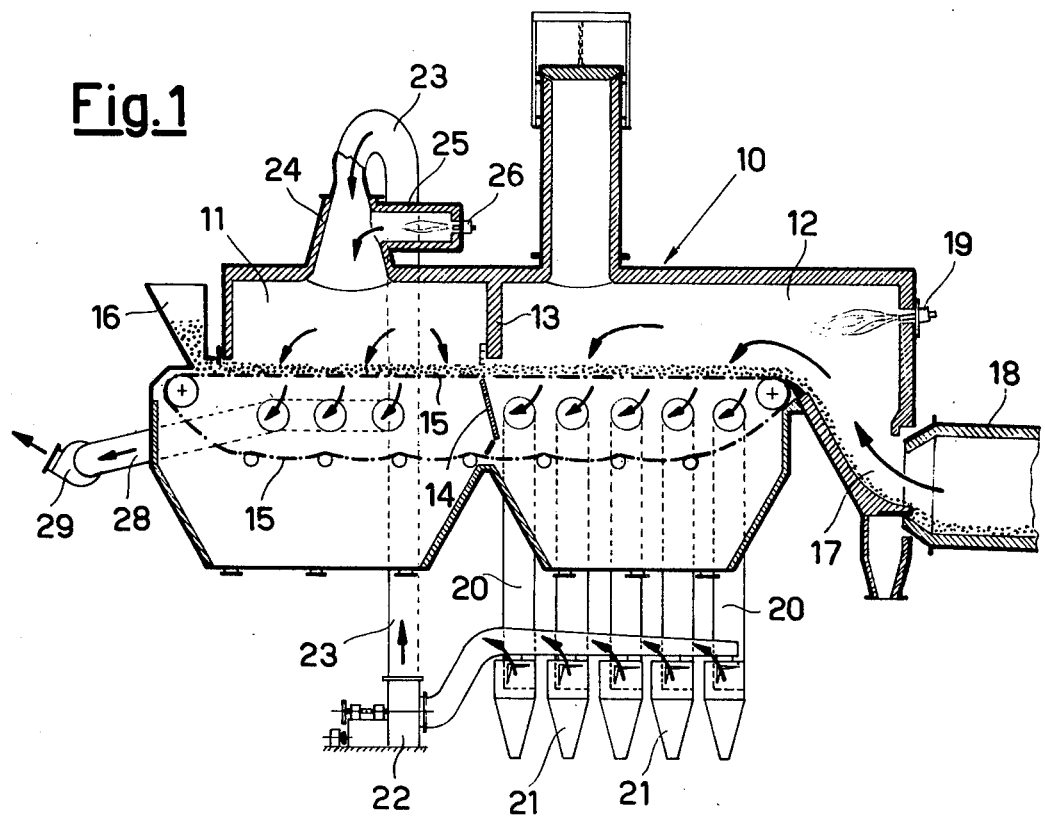

United States Patent [19]

Bucchi

[11] 4,146,360
[45] Mar. 27, 1979

[54] DEVICE FOR CONTROLLING THE GAS TEMPERATURE IN THE DRYING CHAMBER OF A MOVING GRATE PREHEATER FOR CEMENT CLINKER PRODUCTION

[75] Inventor: Renato Bucchi, Bergamo, Italy

[73] Assignee: ITALCEMENTI Fabbriche Riunite Cemento S.p.A., Bergamo, Italy

[21] Appl. No.: 773,773

[22] Filed: Mar. 2, 1977

[30] Foreign Application Priority Data

Oct. 12, 1976 [IT] Italy ................................ 28239 A/76

[51] Int. Cl.² ............................................ F27B 15/00
[52] U.S. Cl. ...................................... 432/58; 432/106
[58] Field of Search ................. 432/14, 15, 58, 106; 106/100

[56] References Cited

U.S. PATENT DOCUMENTS

| | | | |
|---|---|---|---|
| 3,313,534 | 4/1967 | Frans | 432/58 |
| 3,782,888 | 1/1974 | Cnare | 432/14 |
| 3,920,380 | 11/1975 | Heian | 432/106 |
| 4,047,884 | 9/1977 | Heian | 432/21 |

Primary Examiner—John J. Camby
Attorney, Agent, or Firm—Charles E. Brown

[57] ABSTRACT

This invention relates to a device for controlling the gas temperature in the drying chamber of a moving grate preheater for cement clinker production. The device according to the invention comprises means for feeding high temperature gas for mixing with the recycle gas from the preheater calcining chamber, and means for controlling the temperature and/or quantity of said high temperature gas. It is thus possible to control the recycle gas temperature in order to stabilize it at the most suitable value for treating the material to be dried and preheated.

10 Claims, 2 Drawing Figures

U.S. Patent   Mar. 27, 1979   4,146,360

DEVICE FOR CONTROLLING THE GAS TEMPERATURE IN THE DRYING CHAMBER OF A MOVING GRATE PREHEATER FOR CEMENT CLINKER PRODUCTION

This invention relates to a device for controlling the gas temperature in the drying chamber of a moving grate preheater for cement clinker production.

In cement clinker production, moving grate preheaters are used in which the previously granulated, briquetted or extruded material is disposed in a layer of substantially constant thickness, and is traversed one or more times by the gas from the rotary furnace in which the baking is completed. In the most frequently used system, the hot gas passes through the material twice, for which the preheater is divided into two parts, known respectively as the calcining chamber and drying chamber.

To increase the degree of preparation of the material and thus obtain better furnace operation, one or more burners are sometimes provided in the calcining chamber, by which the temperature of the gas passing through the material in said chamber may be raised.

The gas, known as the recycle gas, is then fed into the drying chamber by a fan known as the intermediate exhaust fan, and passes through the still moist granular material in order to dry it and preheat it.

The temperature of the recycle gas varies according to numerous parameters characteristic of the furnace operation, and is difficult to control.

The degree of preparation of the material and its behaviour in the subsequent calcining chamber and rotary furnace are different for different recycle gas temperatures.

The object of the present invention is to prevent the drawbacks due to inconstant material preparation and behaviour.

This object is attained by a device for controlling the gas temperature in the drying chamber of a moving grate preheater, comprising means for feeding high temperature gas for mixing with the recycle gas from the preheater calcining chamber, and means for controlling the temperature and/or quantity of said high temperature gas.

The high temperature gas fed for the purpose of mixing with the recycle gas may be obtained or produced in any manner, but are preferably produced in a special combustion chamber opening into the duct feeding the recycle gas to the drying chamber. This combustion chamber may be provided with a suitably adjustable gas, fuel oil or coal burner in which atmospheric air or hot air from any source, such as the clinker cooler, or hot gas containing a residual percentage of $O_2$ are used as the supporter of combustion.

The advantage of the device according to the invention is the facility to control the recycle gas temperature in order to stabilise it at the most suitable value for treating the material to be dried and preheated.

By using a combustion chamber for producing the high temperature gas for mixing with the recycle gas, instead of using hot gas from another source, gas may be produced at very high temperature and thus small quantities of gas may be sufficient for the required control, without substantially changing the final volume of the exhaust gas from the cycle.

Figure 2:
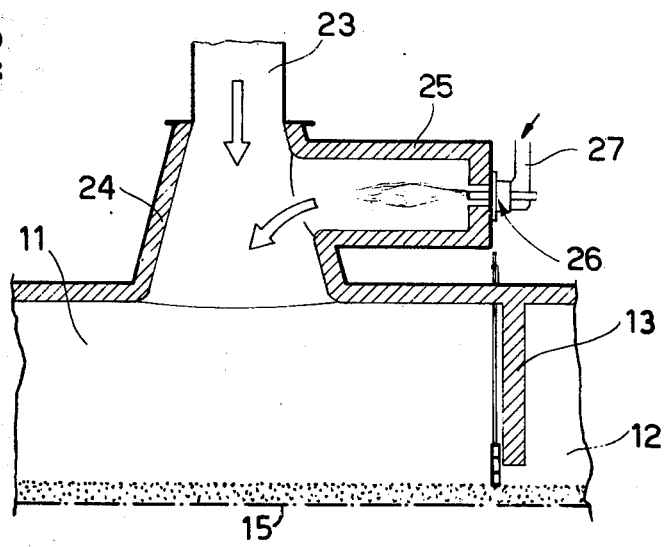

One possible embodiment of the device according to the invention is shown by way of example in the accompanying drawing, in which:

FIG. 1 is a diagrammatic longitudinal section through a moving grate preheater fitted with the device according to the invention, and FIG. 2 is a more detailed view of the device fitted to the gas inlet of the preheater drying chamber.

The preheater, indicated overall by the reference numeral 10, comprises a drying chamber 11 and a calcining chamber 12 separated by walls 13, 14 which form passages for an endless grate conveyor 15 arranged to convey the material fed from a hopper 16 firstly through the drying chamber 11 and then through the calcining chamber 12, from which the treated material leaves throuh a port 17 and reaches the rotary furnace 18 (only partly shown).

The combustion gas from the rotary furnace 18 enters the calcining chamber 12 through the port 17 in countercurrent with the material leaving the preheater, and is mixed with the combustion gas from a burner 19 so that together they pass through the already preheated material from the drying chamber 11 conveyed by the mobile grate 15. After passing through the material, the gas leaves the calcining chamber through pipes 20 which lead to a like number of cyclones 21 in which the dust is removed from the gas. A fan 22, known as the intermediate exhaust fan, then feeds the gas in the form of recycle gas through a pipe 23 into the inlet duct 24 disposed at the top of the drying chamber 11.

According to the invention, a combustion chamber 25 comprising a burner 26 (see especially FIG. 2) is associated with this recycle gas inlet duct 24. The combustion chamber 25 is connected to the duct 24, such that when the hot gas produced in it enters the duct 24, it is mixed with the recycle gas from the pipe 23 before its inlet into the drying chamber 11.

The burner 26 is preferably a gas or fuel oil burner and receives its hot or cold combustion air through a pipe 27.

The gas mixture formed by the recycle gas and the gas produced by the combustion of the burner 26 passes through the moist material originating from the hopper 16 and conveyed by the moving grate, and is then removed from the cycle through a pipe 28 by a fan 29 known as the tail exhaust fan.

Gas at very high temperature is produced in the combustion chamber 25, such that only small quantities of gas added to the recycle gas are sufficient to control its temperature. The final volume of the gas discharged from the cycle is not substantially varied.

The burner 26 of the combustion chamber 25 is obviously provided with suitable control means (not shown) which automatically vary the temperature of the gas produced as a function of the temperature of the recycle gas, so as to stabilise this latter at the most suitable value for the treatment of the material to be dried and preheated.

The described embodiment comprising the use of a combustion chamber for producing the hot gas to be mixed with the recycle gas has proved particularly advantageous.

However, hot gas of a different origin may be used. Instead of controlling the temperature of the gas to be mixed with the recycle gas, the control means could control its quantity providing that this ensures that the temperature of the gas entering the drying chamber is automatically stabilised at the predetermined value.

Any known automatic control means could be used for this purpose.

What I claim is:

1. A moving grate preheater comprising a housing, said housing having wall means dividing said housing into a driving chamber and a calcining chamber, an endless grate conveyor mounted within said housing for moving material to be treated first through said drying chamber and then through said calcining chamber, means for directing hot gases through said conveyor within said calcining chamber, collector means for collecting said hot gases after passage thereof through said conveyor, duct means leading from said collector means into said drying chamber for recycling said hot gases through said conveyor, said duct means including an inlet duct connected to said housing, a blower incorporated in said duct means upstream of said inlet duct, and auxiliary means for controllably directing high temperature gases directly into said inlet duct immediately adjacent said drying chamber.

2. The preheater of claim 1 wherein said auxiliary means includes a combustion chamber directly opening into said inlet duct.

3. The preheater of claim 2 wherein said inlet duct adjacent said drying chamber is generally conical increasing in size towards said housing, and said combustion chamber is carried by said inlet duct.

4. The preheater of claim 1 wherein said inlet duct adjacent said drying chamber is generally conical increasing in size towards said housing.

5. The preheater of claim 2 wherein said combustion chamber includes a burner having means for directing a flame towards said inlet duct generally normal to the passage of gases circulating therethrough.

6. The preheater of claim 5 together with external means for supplying a combustion supporting gas to said combustion chamber.

7. The preheater of claim 1 wherein said collector means includes cyclones for removing dust from the collected gases.

8. The preheater of claim 1 wherein said calcining chamber is disposed immediately adjacent a furnace and directly receives hot gas therefrom above said conveyor.

9. The preheater of claim 1 wherein there are plural collector means spaced along said conveyor, and duct means leading collected hot gases into said blower.

10. The preheater of claim 9 wherein there is a cyclone for each of said plural collector means.

* * * * *